United States Patent
Min et al.

(10) Patent No.: US 11,276,901 B2
(45) Date of Patent: Mar. 15, 2022

(54) SEPARATOR FOR LITHIUM ION SECONDARY BATTERY AND LITHIUM ION SECONDARY BATTERY COMPRISING THE SAME

(71) Applicant: LG CHEM, LTD., Seoul (KR)

(72) Inventors: Ji-Won Min, Daejeon (KR); Seok-Koo Kim, Daejeon (KR); Hoe-Jin Hah, Daejeon (KR); Janis Doelle, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 111 days.

(21) Appl. No.: 16/088,719

(22) PCT Filed: Sep. 29, 2017

(86) PCT No.: PCT/KR2017/011062
§ 371 (c)(1),
(2) Date: Sep. 26, 2018

(87) PCT Pub. No.: WO2018/066960
PCT Pub. Date: Apr. 12, 2018

(65) Prior Publication Data
US 2020/0127265 A1    Apr. 23, 2020

(30) Foreign Application Priority Data

Oct. 7, 2016 (KR) .................. 10-2016-0130077

(51) Int. Cl.
*H01M 50/00* (2021.01)
*H01M 50/449* (2021.01)
(Continued)

(52) U.S. Cl.
CPC ......... *H01M 50/449* (2021.01); *H01M 4/386* (2013.01); *H01M 4/387* (2013.01);
(Continued)

(58) Field of Classification Search
CPC ..... H01M 2/1686; H01M 4/386; H01M 4/387
See application file for complete search history.

(56) References Cited

U.S. PATENT DOCUMENTS

| 2012/0052192 A1 | 3/2012 | Aramata et al. |
| 2013/0017429 A1 | 1/2013 | Ha et al. |

(Continued)

FOREIGN PATENT DOCUMENTS

| CN | 102893427 A | 1/2013 |
| CN | 103199300 A | 7/2013 |

(Continued)

OTHER PUBLICATIONS

Machine translation of KR-20130070272-A (Year: 2013).*
(Continued)

*Primary Examiner* — Milton I Cano
*Assistant Examiner* — Mary G Henshaw
(74) *Attorney, Agent, or Firm* — Birch, Stewart, Kolasch & Birch, LLP

(57) ABSTRACT

The present disclosure relates to a separator for a lithium ion secondary battery and a battery comprising the separator. The separator supplements the irreversible capacity of a negative electrode. The separator comprises composite particles (A), and the composite particles (A) include a core portion comprising lithium composite metal oxide particles and a shell portion comprising a carbonaceous material with which the core surface is coated at least partially; the composite particles (A) cause lithium deintercalation at 0.1 V to 2.5 V (vs. Li$^+$/Li); the battery has a positive electrode potential of 3 V or more (vs. Li$^+$/Li); and the battery has a driving voltage of 2.5 V to 4.5 V.

7 Claims, 2 Drawing Sheets

(51) Int. Cl.
  *H01M 4/38* (2006.01)
  *H01M 4/505* (2010.01)
  *H01M 4/525* (2010.01)
  *H01M 10/0525* (2010.01)
  *H01M 4/02* (2006.01)

(52) U.S. Cl.
  CPC ........... *H01M 4/505* (2013.01); *H01M 4/525* (2013.01); *H01M 10/0525* (2013.01); *H01M 2004/027* (2013.01); *H01M 2004/028* (2013.01); *H01M 2300/0094* (2013.01)

(56) References Cited

U.S. PATENT DOCUMENTS

| | | |
|---|---|---|
| 2014/0220455 A1 | 8/2014 | Lee et al. |
| 2014/0370358 A1 | 12/2014 | Hong et al. |
| 2015/0380702 A1 | 12/2015 | Lee et al. |
| 2016/0149187 A1* | 5/2016 | Cho ................... H01M 2/145 429/144 |

FOREIGN PATENT DOCUMENTS

| | | |
|---|---|---|
| EP | 2 390 944 A1 | 11/2011 |
| JP | 2003-272590 A | 9/2003 |
| KR | 10-2006-0008568 A | 1/2006 |
| KR | 10-2008-0020530 A | 3/2008 |
| KR | 10-2012-0133409 A | 12/2012 |
| KR | 10-2013-0066746 A | 6/2013 |
| KR | 10-2013-0070272 A | 6/2013 |
| KR | 20130070272 A * | 6/2013 |
| KR | 10-2013-0108620 A | 10/2013 |
| KR | 10-2014-0062295 A | 5/2014 |
| KR | 10-2014-0097193 A | 8/2014 |
| KR | 10-2014-0100290 A | 8/2014 |
| KR | 10-2015-0106818 A | 9/2015 |
| KR | 10-2016-0028828 A | 3/2016 |
| KR | 10-2017-0093606 A | 8/2017 |
| WO | WO 2009/069928 A2 | 6/2009 |
| WO | WO 2012/061191 A2 | 5/2012 |
| WO | WO 2016/038440 A1 | 3/2016 |

OTHER PUBLICATIONS

International Search Report issued in PCT/KR2017/011062 (PCT/ISA/210), dated Feb. 2, 2018.

Machine Translation of KR-10-2016-0028828-A, published Mar. 14, 2016.

* cited by examiner

SEPARATOR FOR LITHIUM ION SECONDARY BATTERY AND LITHIUM ION SECONDARY BATTERY COMPRISING THE SAME

TECHNICAL FIELD

The present disclosure relates to a separator for a lithium ion secondary battery and a battery comprising the separator. Particularly, the present disclosure relates to a battery in which irreversible capacity of a negative electrode is supplemented from a separator.

The present application claims priority to Korean Patent Application No. 10-2016-0130077 filed on Oct. 7, 2016 in the Republic of Korea, the disclosures of which are incorporated herein by reference.

BACKGROUND ART

As mobile instruments, such as cellular phones or notebook computers, have been developed, a demand for repeatedly rechargeable secondary batteries as energy sources thereof has increased rapidly. Recently, use of secondary batteries has been activated as power sources for hybrid electric vehicles (HEV) and electric vehicles (EV). Therefore, many studies have been conducted about secondary batteries which meet various needs. Particularly, a demand for a lithium secondary battery having high energy density, high discharge voltage and output is increasing.

A lithium ion secondary battery uses, as a negative electrode active material, a carbonaceous material, such as graphite, metal or metal oxide. When such a negative electrode active material is in contact with an electrolyte, decomposition of the electrolyte ingredients based on reduction-oxidation occurs at the interface. Particularly, on the initial charge, the decomposition product is permanently deposited or adsorbed on the negative electrode surface to form a solid electrolyte interphase (SEI) film. When such a SEI film is formed, lithium is consumed as an ingredient of the SEI film and electron transfer occurs from the negative electrode to the electrolyte to cause decomposition of the electrolyte, resulting in a decrease in initial capacity after the initial charge.

Particularly, metallic materials, such as Si and Sn, have a theoretical capacity corresponding to about 4 times of the theoretical capacity of a carbonaceous material and show high energy density, and thus are highly valuable as negative electrode active materials. However, in the case of the above-mentioned materials, particularly tin oxide, irreversible reaction occurs to form $Li_2O$ and Sn according to the following reaction scheme, when it reacts with lithium during the initial cycle. In addition, nano-sized Sn metal particles are distributed as a dispersion phase in a continuous phase of $Li_2O$ to form an active phase (Sn)/inactive phase ($Li_2O$) complex, and Sn reacts reversibly with Li during the following continuous cycles.

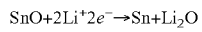
$SnO+2Li^++2e^-\rightarrow Sn+Li_2O$

However, in the case of the above-mentioned oxide, loss of capacity caused by the initial irreversible reaction related with formation of $Li_2O$ is very significant, which is indicated as a severe problem in terms of actual application to a lithium secondary battery. Therefore, there is a need for a solution to solve the problem of irreversible capacity loss.

DISCLOSURE

Technical Problem

The present disclosure is designed to solve the problems of the prior art, and therefore the present disclosure is directed to providing a separator for an electrochemical device which supplements lithium consumed irreversibly during the initial charge to reduce the irreversible capacity of a battery, and a secondary battery comprising the same. These and other objects and advantages of the present disclosure may be understood from the following detailed description and will become more fully apparent from the exemplary embodiments of the present disclosure.

Technical Solution

In one aspect of the present disclosure, there is provided a lithium ion secondary battery to solve the above-mentioned problem.

According to a first embodiment of the present disclosure, there is provided a lithium ion secondary battery comprising a negative electrode, a positive electrode and a separator interposed between the negative electrode and the positive electrode, wherein the separator comprises composite particles (A), and the composite particles (A) comprise a core portion comprising lithium composite metal oxide particles and a shell portion comprising a carbonaceous material with which the core surface is coated at least partially; the composite particles (A) cause lithium deintercalation at 0.1 V-2.5 V (vs. $Li^+/Li$); the battery has a positive electrode potential of 3 V or more (vs. $Li^+/Li$); and the battery has a driving voltage of 2.5 V-4.5 V.

According to a second embodiment, there is provided the lithium ion secondary battery of the first embodiment, wherein the negative electrode comprises a negative electrode active material comprising Si and/or Sn, or an oxide thereof.

According to a third embodiment, there is provided the lithium ion secondary battery of the first or the second embodiment, wherein the positive electrode includes, as a positive electrode active material, at least one selected from the group consisting of: lithium manganese oxide, such as $Li_{1+x}Mn_{2-x}O_4$ (wherein x is 0 to 0.33), $LiMnO_3$, $LiMn_2O_3$ or $LiMnO_2$; Ni site-type lithium nickel oxide represented by the chemical formula of $LiNi_{1-x}M_xO_2$ (wherein M=Mn and x=0.01 to 0.3); lithium manganese composite oxide represented by the chemical formula of $LiMn_{2-x}M_xO_2$ (wherein M=Co, Ni, Fe, Cr, Zn or Ta and x=0.01 to 0.1) or $Li_2Mn_3MO_8$ (wherein M=Fe, Co, Ni, Cu or Zn); $LiMn_2O_4$ in which Li is partially substituted with alkaline earth metal ions; and $LiNi_xMn_{2-x}O_4$ (wherein $0.01 \leq x \leq 0.6$).

According to a fourth embodiment, there is provided the lithium ion secondary battery of the first to the third embodiments, wherein the composite particles (A) cause lithium deintercalation during the initial charge/discharge of the battery to supplement irreversible capacity of the negative electrode and do not contribute to the battery capacity from the second charge/discharge.

According to a fifth embodiment, there is provided the lithium ion secondary battery of the first to the fourth embodiments, wherein the separator comprises: a porous film comprising a polymer resin; and a lithium-providing layer formed on at least one surface of the porous film, and wherein the lithium-providing layer comprises the composite particles (A).

According to a sixth embodiment, there is provided the lithium ion secondary battery of the fifth embodiment, wherein the lithium-providing layer is patterned to have a non-coated region.

According to a seventh embodiment, there is provided the lithium ion secondary battery of the first to the sixth embodiments, wherein the separator comprises: a porous film comprising a polymer resin; a lithium-providing layer formed on one surface of the porous film; and a heat resistant layer formed on the other surface of the porous film, and wherein the first lithium-providing layer comprises the composite particles (A) and the heat resistant layer comprises inorganic particles (B) not comprising lithium as an ingredient.

According to an eighth embodiment, there is provided the lithium ion secondary battery of the fifth embodiment, wherein the composite particles (A) are present in an amount of 90 wt % or more based on 100 wt % of the lithium-providing layer.

According to a ninth embodiment, there is provided the lithium ion secondary battery of the first to the eighth embodiments, wherein the separator comprises, as lithium composite metal oxide particles, any one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ ($Li_xSi_yS_z$, $0<x<3$, $0<y<2$, $0<z<4$)-based glass and $P_2S_5$ ($Li_xP_yS_z$, $0<x<3$, $0<y<3$, $0<z<7$)-based glass, or a combination of two or more of them.

According to a tenth embodiment, there is provided the lithium ion secondary battery of the first to the ninth embodiments, wherein the carbonaceous material coating is formed by carbonization of a carbonaceous precursor.

According to an eleventh embodiment, there is provided the lithium ion secondary battery of the tenth embodiment, wherein the carbonaceous precursor is any one selected from the group consisting of pitch, furfuryl alcohol, glucose, sucrose, phenolic resin, phenolic oligomer, resorcinol resin, resorcinol oligomer, phloroglucinol resin, phloroglucinol oligomer and unsaturated hydrocarbon gases, such as ethylene, propylene or acetylene, or a combination of two or more of them.

In another aspect of the present disclosure, there is provided a separator as defined in the following embodiment.

According to a twelfth embodiment, there is provided a separator for a lithium ion secondary battery which comprises composite particles (A), and the composite particles (A) cause lithium deintercalation at 0.1 V to 2.5 V (vs. $Li^+/Li$).

Advantageous Effects

The battery according to the present disclosure reduces generation of irreversible capacity resulting from the initial charge by supplementing lithium ions from a separator during the initial charge, and shows increased capacity maintenance.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

The present disclosure relates to a separator for an electrochemical device and a lithium ion secondary battery comprising the separator.

Hereinafter, the separator according to the present disclosure will be explained in detail.

The separator according to the present disclosure is provided with a lithium-providing layer on at least one surface thereof. The lithium-providing layer provides lithium during the initial charge of the battery and functions to reduce the irreversible capacity generated during the initial charge.

Figure 1:
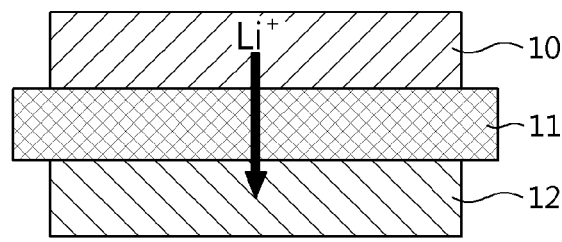
FIG. 1 is a schematic view illustrating generation and transfer of lithium ions in the battery according to the prior art.

FIG. 1 shows a battery provided with a separator according to the prior art. Referring to FIG. 1, lithium ions are merely provided from the positive electrode active material of a positive electrode 10 to a negative electrode 12 by way of a separator 11 and are used to form a solid electrolyte interphase (SEI) film. Thus, only the remaining lithium ions are intercalated to the negative electrode, thereby causing a problem of degradation of reversible capacity. Particularly, when the negative electrode active material comprises a metal ingredient, such as Sn or Si, as described above, a lithium compound is formed in the metal phase to cause irreversible consumption of lithium, and thus degradation of reversible capacity may become more severe.

Figure 2:
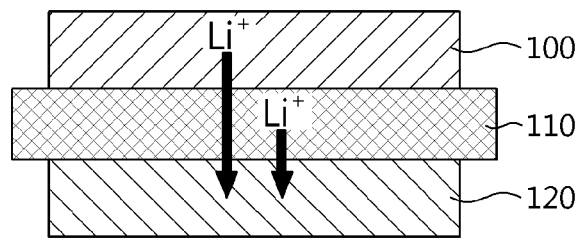
FIG. 2 is a schematic view illustrating generation and transfer of lithium ions in the battery according to the present disclosure.

FIG. 2 is a schematic view illustrating a separator according to the present disclosure and a battery comprising the separator 110. The battery of FIG. 2 comprises a positive electrode 100, a negative electrode 120 and a separator 110 interposed between the positive electrode and the negative electrode. Referring to FIG. 2, lithium ions are provided to the negative electrode 120 from the separator during the initial charge, and thus it is possible to supplement the amount of irreversibly consumed lithium ions. Therefore, it is possible to solve the problem of degradation of capacity caused by the initial charge of the battery.

According to an embodiment of the present disclosure, the separator may include a porous polymer film layer and a lithium-providing layer is provided on at least one surface of the film layer. According to another embodiment, the separator according to the present disclosure is provided with a lithium-providing layer on one surface of the film layer and a heat resistant layer comprising inorganic particles on the other surface of the film layer.

The lithium-providing layer comprises composite particles (A) having a core-shell structure. The composite particles (A) have a core portion and a coating layer with which the core surface is coated at least partially. The core portion comprises lithium composite metal oxide particles and the shell portion comprises a carbonaceous material.

The composite particles (A) cause lithium deintercalation at 0.1 V to 2.5 V (vs. Li$^+$/Li), 0.1 V to 2.0 V, 0.1 V to 1.5 V, or 0.1 V to 1.0 V. According to an embodiment of the present disclosure, the composite particles (A) in the lithium-providing layer are present in an amount of 90 wt % or more based on 100 wt % of the lithium-providing layer. According to the present disclosure, since the composite particles (A) have the above-defined driving voltage range, they cause lithium deintercalation during the initial charge of the battery to supplement the irreversible capacity of the negative electrode and do not contribute to the battery capacity from the second charge/discharge.

Meanwhile, the lithium composite metal particles are not particularly limited, as long as they cause lithium deintercalation in the above-defined voltage range to provide lithium to the electrode. Non-limiting examples of the lithium composite metal oxide particles include: any one selected from the group consisting of lithium phosphate (Li$_3$PO$_4$), lithium titanium phosphate (Li$_x$Ti$_y$(PO$_4$)$_3$, 0<x<2, 0<y<3), lithium aluminum titanium phosphate (Li$_x$Al$_y$Ti$_z$(PO4)$_3$, 0<x<2, 0<y<1, 0<z<3), (LiAlTiP)$_x$O$_y$-based glass (0<x<4, 0<y<13), lithium lanthanum titanate (Li$_x$La$_y$TiO$_3$, 0<x<2, 0<y<3), lithium germanium thiophosphate (LixGe$_y$-P$_z$S$_w$, 0<x<4, 0<y<1, 0<z<1, 0<w<5), lithium nitride (Li$_x$N$_y$, 0<x<4, 0<y<2), SiS$_2$ (Li$_x$Si$_y$S$_z$, 0<x<3, 0<y<2, 0<z<4)-based glass and P$_2$S$_5$ (Li$_x$P$_y$S$_z$, 0<x<3, 0<y<3, 0<z<7)-based glass, or a combination of two or more of them.

The lithium composite metal oxide particles may have a diameter of 0.1 to 10 in.

The diameter of the lithium composite metal oxide particles means the particle size (D$_{50}$) of 50% of the integrated value from a smaller particle diameter calculated based on the results of measurement of particle size distribution of the particles after the classification thereof using a conventional particle size distribution measuring system. Such particle size distribution can be determined by an intensity pattern of diffraction or scattering generated by the contact of light with the particles. Particular examples of the particle size distribution measuring system include Microtrack 9220FRA or Microtrack HRA available from Nikkiso, Inc.

In addition, according to the present disclosure, the composite particles (A) include a core portion comprising lithium composite metal oxide particles and a shell portion comprising a carbonaceous material with which the core surface is coated partially or totally. The carbonaceous material may include, but is not limited to: natural graphite, artificial graphite, carbon black, acetylene black, ketjen black, channel black, furnace black, lamp black, thermal black, carbon nanotubes, fullerene, carbon fibers, or the like. Since the lithium composite metal oxide particles have improved conductivity by virtue of the coating with the carbonaceous material, lithium can be deintercalated from the composite particles (A) effectively during the initial charge/discharge of the battery.

In a variant, the composite particles (A) may be obtained by coating lithium composite metal oxide particles with a carbon precursor and carrying out sintering at high temperature. The carbon precursor is not particularly limited, as long as it produces carbon through heat treatment. Particular examples of the carbon precursor include pitch or hydrocarbon materials. In addition, particular examples of the hydrocarbon materials include any one selected from the group consisting of furfuryl alcohol, glucose, sucrose, phenolic resin, phenolic oligomer, resorcinol resin, resorcinol oligomer, phloroglucinol resin, phloroglucinol oligomer and unsaturated hydrocarbon gases, such as ethylene, propylene or acetylene, or a combination of two or more of them.

The heat treatment for carbon coating may be carried out at a temperature of 200 to 1000° C. or 700 to 900° C. According to an embodiment of the present disclosure, the lithium composite metal oxide and carbon precursor may be mixed at a weight ratio of about 70:30 to 99:1. For example, 90 wt % of the lithium composite metal oxide is mixed with 10 wt % of the carbon precursor and heat treatment is carried out at a temperature of 800° C. for about 2 to 6 hours to obtain composite particles (A) coated with the carbonaceous material. Methods for such carbon coating are not particularly limited, as long as they can coat the surface of silicon oxide with carbon.

According to an embodiment of the present disclosure, the shell portion may have a thickness of 5 nm to 50 nm.

According to another embodiment of the present disclosure, the shell portion may be coated to a degree of 10 to 60% based on the total area of the core portion. Within the above-defined range, it is possible to provide the composite particles (A) with increased conductivity.

In addition, the lithium-providing layer further comprises a binder resin. By virtue of the binder resin, the composite particles (A) can retain binding and/or attachment with each other in the lithium-providing layer and can have adhesion to another layer (e.g. film layer) in the separator and/or an electrode layer.

The interstitial volume generated when the composite particles (A) are in contact with each other in the lithium-providing layer may be provided as pores of the lithium-providing layer. Herein, 'interstitial volume' may be formed in a nano-unit or micro-unit by controlling the size of the composite particles (A) forming the lithium-providing layer formed in the separator, amount of the composite particles (A) and the composition of the binder resin. It is also possible to control the pore size and porosity. As used herein, the term 'interstitial volume' means a vacant space defined by the composite particles (A) that are substantially in face contact with each other in a closed packed or densely packed structure formed by the binding of the composite particles (A) in the lithium-providing layer through the binder resin, and is to be understood as a space for forming pores.

The composite particles (A) in the lithium-providing layer cause lithium deintercalation under the condition of 0.1 V to 2.5 V (vs. Li$^+$/Li). Thus, lithium ions are provided only during the initial charge of the battery so that they are used to prevent excessive generation of irreversible capacity of the negative electrode and do not participate in electrochemical reaction during the charge/discharge steps of the battery after the initial charge. In other words, the composite particles (A) do not contribute to the battery capacity during the charge/discharge of the battery after the second charge. The particles (A), after lithium deintercalation, can carry out the same function as the inorganic particles of a heat resistant layer. Therefore, the separator according to the present disclosure can reduce the irreversible capacity generated during the initial charge, and can additionally function as a heat resistant layer of the separator.

According to the present disclosure, the porous film is not particularly limited, as long as it is used generally as a material for a separator for an electrochemical device. For examples, it is possible to use a porous polymer film comprising at least one of polyolefin, polyethylene terephthalate, polybutylene terephthalate, polyacetal, polyamide, polycarbonate, polyimide, polyetherether ketone, polyether sulfone, polyphenylene oxide, polyphenylene sulfide, or polyethylene naphthalene. According to an embodiment, the porous film may be a stacked film comprising at least two films stacked successively.

According to the present disclosure, the heat resistant layer comprises a mixture of inorganic particles with a binder resin. The inorganic particles contained in the heat resistant layer are not particularly limited, as long as they are electrochemically stable. In other words, the inorganic particles are not particularly limited, as long as they do not cause oxidation and/or reduction in the driving voltage range (e.g. 0 to 5 V based on $Li^+/Li$) of the corresponding electrochemical device. According to an embodiment of the present disclosure, particular examples of the inorganic particles include any one selected from the group consisting of $BaTiO_3$, $Pb(Zr,Ti)O_3$ (PZT), $Pb_{1-x}La_xZr_{1-y}Ti_yO_3$ (PLZT, wherein 0<x<1, 0<y<1), $Pb(Mg_{1/3}Nb_{2/3})O_3$—$PbTiO_3$ (PMN-PT), hafnia ($HfO_2$), $SrTiO_3$, $SnO_2$, MgO, NiO, CaO, ZnO, $Al_2O_3$, SiC and $TiO_2$, or a combination of two or more of them.

In the heat resistant layer, the inorganic particles are present in an amount of 90 wt % or more based on 100 wt % of the heat resistant layer. In addition, the inorganic particles (B) of the heat resistant layer are bound and/or attached to each other by the binder resin and have adhesion to another layer (e.g. film layer) in the separator and/or an electrode layer. In the heat resistant layer, the interstitial volume generated when the inorganic particle (B) are in contact with each other can be provided as pores of the heat resistant layer. If desired, the heat resistant layer may include other additives, such as a thickener, dispersant and/or surfactant, and the amount of such additives is 1 to 5 parts by weight based on 100 parts by weight of the heat resistant layer.

In the lithium-providing layer and heat resistant layer, the binder resin is not particularly limited, as long as it can be used for the purpose of binding particles. Each of the layers can use the same binder resin or a different resin.

According to the present disclosure, the binder resin of the lithium-providing layer and heat resistant layer has adhesive property, and particular examples thereof include at least one selected from the group consisting of polyvinylidene fluoride-co-hexafluoropropylene, polyvinylidene fluoride-co-trichloroethylene, polymethyl methacrylate, polyethyl acrylate, polymethyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinylalcohol, cyanoethyl cellulose, cyanoethyl sucrose, pullulan and carboxymethyl cellulose.

The present disclosure also relates to a lithium ion battery comprising the above-described separator. The battery comprises an electrode assembly having a negative electrode, a positive electrode and a separator interposed between the negative electrode and the positive electrode, wherein the separator is the separator according to the present disclosure and is provided with a lithium-providing layer on the surface thereof.

According to the present disclosure, the lithium ion battery has a positive electrode potential of 3 V or more, 3.5 V or more, 4.0V or more, or 4.2V or more (vs. $Li^+/Li$); and the battery has a driving voltage of 2.5 V to 4.5 V or 2.5 v to 4.25 V.

According to the present disclosure, each of the negative electrode and the positive electrode comprises a current collector and an electrode layer formed on at least one surface of the current collector.

According to the present disclosure, the current collector is not particularly limited, as long as it is used for current collection in an electrochemical device. When the electrode is a positive electrode, the current collector may be foil made of aluminum, nickel or a combination thereof. When the electrode is a negative electrode, the current collector may be foil made of copper, gold, nickel, copper alloy or a combination thereof.

In addition, according to the present disclosure, the electrode layer is formed on at least one surface of the current collector and comprises an electrode active material. When the electrode is a positive electrode, particular examples of the electrode active material include any one selected from the group consisting of: a lithium manganese oxide represented by the chemical formula of $Li_{1+x}Mn_{2-x}O_4$ (wherein x is 0 to 0.33), $LiMnO_3$, $LiMn_2O_3$ or $LiMnO_2$; a Ni-site type lithium nickel oxide represented by the chemical formula of $LiNi_{1-x}M_xO_2$ (wherein M is Mn and x is 0.01 to 0.3); a lithium manganese composite oxide represented by the chemical formula of $LiMn_{2-x}M_xO_2$ (wherein M=Co, Ni, Fe, Cr, Zn or Ta, and x is 0.01 to 0.1) or $Li_2Mn_3MO_8$ (wherein M=Fe, Co, Ni, Cu or Zn); $LiMn_2O_4$ in which Li is partially substituted with an alkaline earth metal ion; $LiNi_xMn_{2-x}O_4$ (0.01≤x≤0.6); $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein each of M1 and M2 is independently selected from the group consisting of Al, Ni, Co, Fe, Mn, V, Cr, Ti, W, Ta, Mg and Mo, each of x, y and z independently represents an atomic proportion of elements forming the oxide, and 0≤x<0.5, 0≤y<0.5, 0≤z<0.5, x+y+z≤1); or a combination of two or more of them.

In addition, the negative electrode comprises, as a negative electrode active material, carbon and graphite materials, such as natural graphite, artificial graphite, expanded graphite, carbon fibers, non-graphitizable carbon, carbon black, carbon nanotubes, fullerene and activated carbon; metals, such as Al, Si, Sn, Ag, Bi, Mg, Zn, In, Ge, Pb, Pd, Pt and Ti, capable of alloying with lithium, and compounds comprising the above elements; metals and metallic compounds, and composite compounds of carbon and graphite materials; lithium-comprising nitrides; or the like. According to an embodiment of the present disclosure, the negative electrode comprises, as a negative electrode active material, at least one selected from Si, Sn, compounds comprising Si and/or Sn, and composites thereof with carbonaceous materials.

According to the present disclosure, the electrochemical device comprises any device which carries out electrochemical reaction, and particular examples thereof include all types of primary batteries, secondary batteries, fuel cells, solar cells or capacitors such as super capacitor devices. Particularly, among the secondary batteries, lithium secondary batteries, comprising lithium metal secondary batteries, lithium ion secondary batteries, lithium polymer secondary batteries or lithium ion polymer ion batteries, are preferred.

According to an embodiment of the present disclosure, the lithium-providing layer may be formed merely in a portion of one sectional surface of the porous substrate. For example, the lithium-providing layer may be patterned to have a non-coated portion, where no lithium-providing layer is formed, on one sectional surface of the porous substrate. Such a patterned layer may be provided as a path through which an electrolyte flows. It is possible to improve the wettability of the separator upon the injection of an electrolyte by virtue of the patterning.

Meanwhile, according to the above-described embodiments, the composite particles (A), which are coated particles comprising a core portion comprising a lithium composite metal oxide, wherein the surface of the core is coated totally or at least partially with a carbonaceous material, are positioned in the separator. However, the coated composite particles (A) may be incorporated not only to the separator but also to the positive electrode. In a variant, the composite particles (A) may be incorporated merely to the positive electrode while not being incorporated to the separator. As described above, when the composite particles (A) are incorporated to the positive electrode, it is preferred that the composite particles (A) are present in an amount of at most 10 wt % based on the total weight of the positive electrode active material and the composite particles (A).

In addition, other battery elements not described herein, such as a conductive material and an electrolyte, may be used and such elements may include those used conventionally in the field of a battery, particularly in the field of a lithium secondary battery.

Hereinafter, the present disclosure will be explained with reference to Examples and Comparative Examples. However, the following examples are for illustrative purposes only and not intended to limit the scope of the present disclosure.

EXAMPLES

Example 1

Preparation Example 1: Manufacture of Positive Electrode $LiCoO_2$ and $Li_2MoO_3$ as positive electrode active materials, solef6020 as a binder and denka black as a conductive material, and N-methyl-2-pyrrolidone (NMP) as a mixing solvent were used to provide slurry having a weight ratio 96:2:2 and the slurry was coated onto an aluminum current collector having a thickness of 12 μm. Then, the slurry was dried and subjected to pressing to obtain a positive electrode plate.

Preparation Example 2: Manufacture of Negative Electrode

Graphite and silicon oxide (SiOx, x=1) powder (available from Shinetsu) as negative electrode active materials, carboxymethyl cellulose (CMC) and styrene butadiene rubber (SBR) as binders and water as a mixing solvent were used to provide slurry having a weight ratio of 98:1:1 and the slurry was coated onto a copper current collector having a thickness of 12 μm. Then, the slurry was dried and subjected to pressing, like the positive electrode plate, to obtain a negative electrode plate.

Preparation Example 3: Preparation of Composite Particles A

First, 20 g of lithium aluminum titanium phosphate ($Li_{1.3}Al_{0.3}Ti_{1.7}(PO_4)_3$) was introduced to a rotary tubular furnace, argon gas was allowed to flow therethrough at 0.5 L/min, and the temperature was increased to 800° C. at a rate of 5° C./min. While the rotary tubular furnace was rotated under 10 rpm/min, argon gas and acetylene gas were allowed to flow at a rate of 1.8 L/min and 0.3 L/min, respectively, to carry out heat treatment for 5 hours, thereby forming composite particles (A) having a carbon coating layer on the surface of lithium aluminum titanium phosphate particles. Herein, the lithium aluminum titanium phosphate particles had a particle diameter of 5 μm and the carbon coating layer had a thickness of 10 nm and a coating ratio of 20%.

Preparation Example 4: Manufacture of Separator

Poluvinylidene fluoride-co-chlorotrifluoroethylene (PVdF-CTFE) and cyanoethyl pullulan were added to acetone at a weight ratio of 10:2 an dissolved therein at 50° C. for about 12 hours or more to provide a polymer solution. The composite particles (A) obtained from Preparation Example 3 were added to the polymer solution so that the weight ratio of polymer/composite particles (A) might be 10/90, and dispersed therein to obtain slurry for a lithium-providing layer.

The slurry for a lithium-providing layer was coated onto one surface of a polyethylene porous membrane (porosity 45%) having a thickness of 12 μm through a slot die. The slurry coating amount was 60 mAh/cm² so that the finished lithium-providing layer might have a thickness of 4 μm. Then, the coated substrate was allowed to pass through a drying system controlled to a temperature of 50° C. to dry the solvent, thereby forming a lithium-providing layer.

Then, inorganic particles comprising $Al_2O_3$ powder and $BaTiO_3$ powder mixed at a weight ratio of 9:1 were added to the polymer solution to a weight ratio of polymer/inorganic particles of 10/90. The inorganic particles were crushed and dispersed by using a ball mill for 12 hours or more to obtain slurry for a heat resistant layer. The obtained slurry had an average particle diameter of inorganic particles of 600 nm.

The polymer solution was formed by adding polyvinylidene fluoride-co-chlorotrifluoroethylene and cyanoethyl pullulan to acetone at a weight ratio of 10:2.

The prepared slurry for a heat resistant layer was coated onto the other surface of the polyethylene porous membrane (porosity 45%) having the lithium-providing layer through a slot die. The slurry coating amount was set to 60 mAh/cm² so that the finished heat resistant layer might have a thickness of 4 μm. Then, the coated substrate was allowed to pass through a drying system controlled to a temperature of 50° C. to dry the solvent, thereby finishing a separator.

Preparation Example 5: Manufacture of Battery

The positive electrode according to Preparation Example 1 and the negative electrode according to Preparation Example 2 were laminated with the separator according to Preparation Example 4 interposed therebetween to obtain a coin cell. As an electrolyte, a mixed solution comprising ethylene carbonate (EC) and dimethyl carbonate (EMC) at a volume ratio of 1:1 was used.

Comparative Example 1

Figure 3:
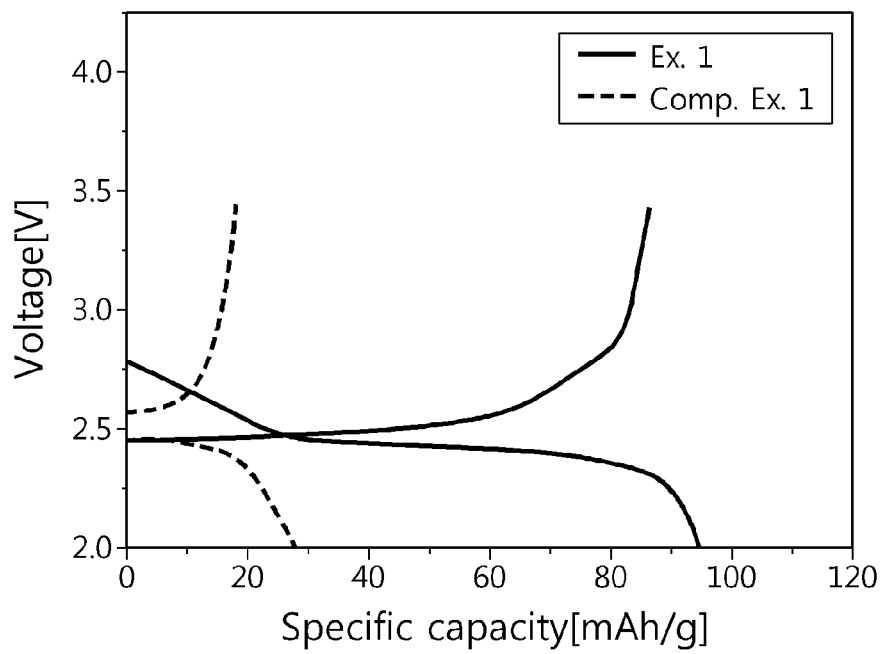
FIG. 3 is a graph illustrating a difference in capacity realized in the batteries according to Example and Comparative example.

A battery was obtained in the same manner as Example 1, except that lithium aluminum titanium phosphate in the lithium-providing layer was not coated with carbon and the particles were used as they were. The results are shown in FIG. 3.

Comparative Example 2

Figure 4:
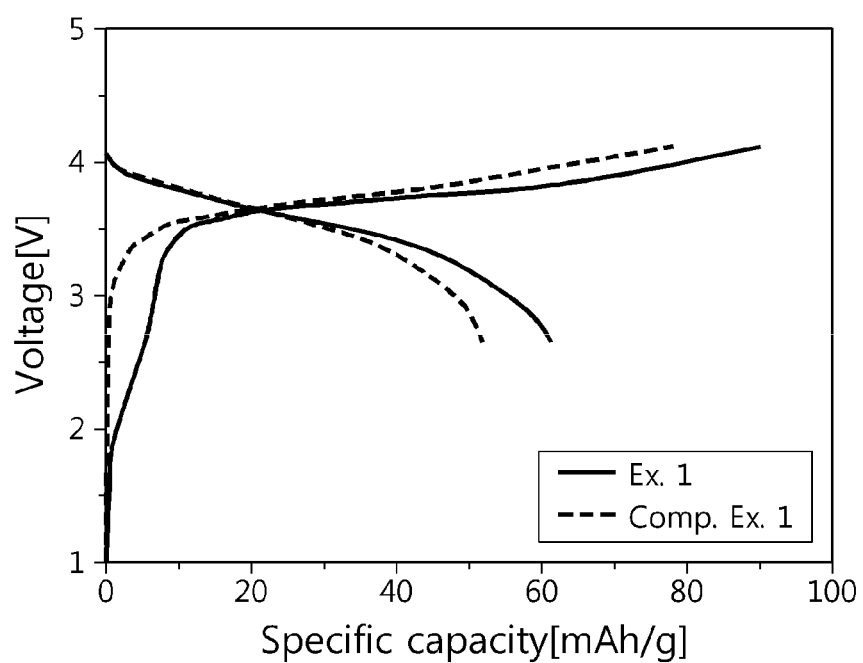
FIG. 4 is a graph illustrating charge/discharge characteristics of the batteries according to Example and Comparative example.

A battery was obtained in the same manner as Example 1, except that the slurry for a lithium-providing layer was not used but the slurry for a heat resistant layer was used to coat both surfaces of the polyethylene porous membrane. The results are shown in FIG. 4.

Comparative Example 3

A battery was obtained in the same manner as Comparative Example 1, except that lithium aluminum titanium phosphate particles were not used in the lithium-providing layer but $LiNi_{1/3}Mn_{1/3}Co_{1/3}O_2$ was used. The results are shown in Table 1.

Comparative Example 4

A battery was obtained in the same manner as Example 1, except that lithium aluminum titanium phosphate particles were not used in the lithium-providing layer but $LiNi_{1/3}Mn_{1/3}Co_{1/3}O_2$ was used. The results are shown in Table 1.

Comparative Example 5

Particles (C) were obtained by mixing 20 g of $LiNi_{1/3}Mn_{1/3}Co_{1/3}O_2$ instead of lithium aluminum titanium phosphate particles with a conductive material (Super P).

A battery was obtained in the same manner as Example 1, except that the particles (C) were used instead of the composite particles (A). The results are shown in Table 1.

Test Example: Evaluation of Batteries
(Charge/Discharge Characteristics of Batteries)

Each of the batteries according to Example 1 and Comparative Examples 1 and 2 was used to evaluate initial charge/discharge efficiency. Each battery was charged to 4.0 V at 0.1 C in a constant-current mode during the first cycle and discharged to 2.1 V in a constant-current mode. According to the present disclosure, initial charge/discharge efficiency is defined by the following Mathematical Formula 1:

Initial charge/discharge efficiency (%)=[Discharge capacity during the first cycle/Charge capacity during the first cycle]×100   [Mathematical Formula 1]

FIG. 3 shows the results of initial charge/discharge efficiency of each of the batteries according to Example 1 and Comparative Examples 1. The battery according to Example 1 comprises composite particles (A) comprising lithium aluminum titanium phosphate and having a carbon coating layer on the surface thereof. The battery according to Comparative Example 1 comprises lithium aluminum titanium phosphate particles having no carbon coating. As shown in FIG. 3, the battery according to Example 1 shows a higher capacity as compared to the battery according to Comparative Example 1.

FIG. 4 is a graph illustrating the results of initial charge/discharge efficiency of each of the batteries according to Example 1 and Comparative Example 2. It can be seen that the battery according to Example 1 has a higher initial charge/discharge efficiency as compared to the battery according to Comparative Example 2.

Test Example: Evaluation of Batteries (Capacity Cycle Maintenance of Batteries)

Each of the lithium secondary batteries according to Example 1 and Comparative Examples 3 to 5 was subjected to 50 cycles of charge in a 1C-rate constant-current/constant-voltage mode and discharged in a 1C constant-current mode, at 45° C., and then determined for capacity and capacity maintenance. The results are shown in Table 1.

TABLE 1

|  | Capacity maintenance after 50 cycles (%) |
| --- | --- |
| Example 1 | 95 |
| Comparative Example 3 | 72 |
| Comparative Example 4 | 86 |
| Comparative Example 5 | 84 |

Comparative Example 3 has no carbon coating on the surface of $LiNi_{1/3}Mn_{1/3}Co_{1/3}O_2$ particles, and shows a capacity maintenance of 72%, which is significantly lower than the capacity maintenance (95%) according to Example 1. In addition, Comparative Examples 4 and 5 show a lower capacity maintenance as compared to Example 1. This is because $LiNi_{1/3}Mn_{1/3}Co_{1/3}O_2$ is provided as a lithium source even after the initial charge/discharge according to Comparative Examples 3, 4 and 5, unlike the lithium composite oxide particles according to Example 1.

What is claimed is:

1. A lithium ion secondary battery comprising a negative electrode, a positive electrode and a separator interposed between the negative electrode and the positive electrode,
wherein the separator comprises:
a porous film comprising a polymer resin,
wherein the porous film has a first surface and a second surface;
a lithium-providing layer formed on the first surface of the porous film; and
a heat resistant layer formed on the second surface of the porous film, and
wherein the lithium-providing layer comprises composite particles (A) and the heat resistant layer comprises inorganic particles (B) not comprising lithium as an ingredient,
wherein the inorganic particles (B) are present in an amount of 90 wt % or more based on 100 wt % of the heat resistant layer,
the composite particles (A) comprise a core portion comprising lithium aluminum titanium phosphate ($Li_xAl_yTi_z(PO_4)_3$, 0<x<2, 0<y<1, 0<z<3) and a shell portion comprising a carbonaceous material with which the core surface is coated at least partially;
the composite particles (A) cause lithium deintercalation at 0.1 V to 2.5 V (vs. Li/Li);
the battery has a positive electrode potential of 3 V or more (vs. Li+/Li); and
the battery has a driving voltage of 2.5 V to 4.5 V,
wherein the composite particles (A) cause lithium deintercalation during the initial charge/discharge of the battery to supplement irreversible capacity of the negative electrode and do not contribute to the battery capacity from the second charge/discharge,
wherein the negative electrode comprises a negative electrode active material comprising Si and/or Sn, or an oxide thereof, and
wherein the composite particles (A) are present in an amount of 90 wt % or more based on 100 wt % of the lithium-providing layer.

2. The lithium ion secondary battery according to claim 1, wherein the positive electrode comprises, as a positive electrode active material, any one selected from the group consisting of: a lithium manganese oxide represented by the chemical formula of $Li_{1+x}Mn_{2-x}O_4$ (wherein x is 0 to 0.33), $LiMnO_3$, $LiMn_2O_3$ or $LiMnO_2$; a Ni-site type lithium nickel oxide represented by the chemical formula of $LiNi_{1-x}M_xO_2$ (wherein M is Mn and x is 0.01 to 0.3); a lithium manganese composite oxide represented by the chemical formula of $LiMn_{2-x}M_xO_2$ (wherein M=Co, Ni, Fe, Cr, Zn or Ta, and x is 0.01 to 0.1) or $Li_2Mn_3MO_8$ (wherein M=Fe, Co, Ni, Cu or Zn); $LiMn_2O_4$ in which Li is partially substituted with an alkaline earth metal ion; $LiNi_xMn_{2-x}O_4$ ($0.01 \le x \le 0.6$); $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein each of M1 and M2 is independently selected from the group consisting of Al, Ni, Co, Fe, Mn, V, Cr, Ti, W, Ta, Mg and Mo, each of x, y and z independently represents an atomic proportion of elements forming the oxide, and $0 \le x < 0.5$, $0 \le y < 0.5$, $0 \le z < 0.5$, $x+y+z \le 1$); or a combination of two or more of them.

3. The lithium ion secondary battery according to claim 1, wherein the lithium-providing layer is patterned to have a non-coated region.

4. The lithium ion secondary battery according to claim 1, wherein the carbonaceous material coating is formed by carbonization of a carbonaceous precursor.

5. The lithium ion secondary battery according to claim 4, wherein the carbonaceous precursor is any one selected from the group consisting of pitch, furfuryl alcohol, glucose, sucrose, phenolic resin, phenolic oligomer, resorcinol resin, resorcinol oligomer, phloroglucinol resin, phloroglucinol oligomer and unsaturated hydrocarbon gases, such as ethylene, propylene or acetylene, or a combination of two or more of them.

6. The lithium ion secondary battery according to claim 1, wherein the shell portion has a thickness of 5 nm to 50 nm.

7. The lithium ion secondary battery according to claim 1, wherein the heat resistant layer further comprises a binder resin.

\* \* \* \* \*